United States Patent Office 3,321,532
Patented May 23, 1967

3,321,532
FLUOROCARBON ETHERS
Carl Edward Lorenz, Wilmington, Del., assignor to E. I. du Pont de Nemours and Company, Wilmington, Del., a corporation of Delaware
No Drawing. Filed Oct. 8, 1963, Ser. No. 314,618
4 Claims. (Cl. 260—614)

This invention relates to the preparation of perfluoroalkyl and perfluoroalkylene perfluorovinyl ethers.

Mixed ethers commonly are prepared by the Williamson synthesis employing a sodium alkoxide and an alkyl halide. This method is not widely applicable, however, for the formation of perfluorinated vinyl ethers. Because of the nonavailability of the perfluorinated primary alcohols needed to form the alkoxide, the method is not suitable for the production of perfluorinated primary alkyl ethers. Moreover, the general nonreactivity of the vinyl halides precludes the formation of vinyl ethers by this method. While United States Patent 2,917,548, issued Dec. 15, 1959, to Dixon, demonstrates that tetrafluoroethylene can be reacted with a sodium alkoxide to form an alkyl perfluorovinyl ether, this method, likewise, is not feasible for the formation of perfluoroalkyl perfluorovinyl ethers, not only because of the nonavailability of the perfluorinated primary alcohols necessary to form perfluorinated primary alkyl ethers, but because the method is limited to the use of sodium alkoxides having a nonfluorine-containing methylene group affixed to the oxygen atom.

It is an object of this invention to provide a process for the formation of perfluoroalkyl and perfluoroalkylene perfluorovinyl ethers. It is a further object to prepare these ethers by a process in which side reactions of the isomerization or degradation variety are minimized. A still further object is to provide a process in which the principal by-product may be converted in situ quickly and easily to one of the necessary starting materials. Other objects will become apparent hereinafter.

The objects of the present invention are achieved by a process wherein a perfluoro-2-alkoxypropionyl fluoride is reacted at elevated temperatures with a solid oxide of an element selected from the group consisting of the Groups II-A, II-B, III-A and IV-A of the Periodic Chart of the Elements such as may be found on pages 448–9 of the "Handbook of Chemistry and Physics," 41st Edition, 1959, to yield a perfluoroalkyl perfluorovinyl ether, carbon dioxide and a fluoride of one of the aforesaid elements. Generally, the reaction is carried out within the temperature range 100 to 450° C., and preferably within the range 275 to 400° C. More particularly, the temperatures utilized are preferably 375 to 400° C. when employing an oxide of a Group IV-A element, and 275 to 325° C. when employing any of the other aforesaid oxides to achieve the optimum in yield and conversion to vinyl ether and a minimum in unwanted by-products. Since the process of the present invention is based upon a metathetical or double decomposition reaction rather than a catalytic process, the oxide should be finely divided to ensure intimate contacting of the reactants. Further, the quantity of the oxide usually is at least stoichiometric with a perfluoro-2-alkoxypropionyl fluoride, and it is preferable to use an excess of the oxide to ensure maximum conversion of the acid fluoride. Although the oxide may be present in quantities less than stoichiometric with the acid fluoride, this method of operation normally is not utilized since larger quantities of unconverted acid fluoride must be handled. The mechanism by which an acid fluoride is converted to a vinyl ether in the present invention is not understood fully. Although a simple metal salt of the acid may be postulated as an intermediate, the reaction may proceed via the formation of a complex metal salt which ultimately is converted to a vinyl ether and the metal fluoride by-product. While any convenient experimental method may be utilized to effect intimate contacting of the reactants, in the preferred process, the acid fluoride vapor is passed through a heated bed of the oxide. In keeping therewith, the reactor preferably is constructed from a material which is inert to the reactants employed. Nickel and stainless steel are examples of structural materials which are useful herein. Moreover, the apparatus should be equipped with suitable means for temperature control to maintain the reaction temperature within the prescribed limits so as to minimize by-product formation. Especially suitable both for facilitating contacting of reactants and controlling of temperature is the use of a fluidized bed technique. Fluidization of the finely divided oxide may be achieved by means of the vaporized propionyl fluoride alone or in combination with a carrier gas such as nitrogen. As indicated hereinabove, the oxide is a solid oxide of an element selected from the group consisting of the Groups II-A, II-B, III-A and IV-A of the Periodic Chart of the Elements. The solid oxide used should be thermally stable at the reaction temperature and where the potential valence of an element is such that a variety of oxides may be formed, the oxide of the metal in its most stable valence state is preferred. Especially preferred oxides are zinc and cadmium oxides and silicon dioxide. During the metathetical reaction, the oxide is converted to a fluoride of one of the aforesaid elements. In most cases, the fluoride, and especially the Group II-B fluorides, may be converted back to the oxide readily within the reactor by contacting either with moist air at 200 to 500° C. or with steam. After regeneration, the oxide must be dried thoroughly before reuse since trace amounts of moisture promote competing side reactions which yield products such as the hydrofluoroalkyl ethers. While silicon dioxide, like zinc and cadmium oxides, is a preferred oxide since it is effective with a minimum of side reactions, this oxide is converted to gaseous silicon tetrafluoride during the metathetical reaction and is lost from the reactor. As a consequence, the gas must be collected and converted to the oxide outside the reactor, a more difficult and less economical process than that required for regenerating the zinc and cadmium salts. While pure oxides may be used in the present invention, impure forms or mixtures, likewise, are effective although it is preferable to avoid using materials having any contaminants which promote side reactions such as hydrocompound formation and isomerization. Further, while the Groups II-A and III-A oxides are useful herein in that they may be reacted with perfluoro-2-alkoxypropionyl fluorides to yield perfluoroalkyl or perfluoroalkylene perfluorovinyl ethers by the process described supra, these oxides are the least preferred since they not only are more difficult to regenerate, but they provide greater quantities of undesirable by-products including hydrofluoroalkyl ethers and the acid fluoride which is formed via isomerization of the desired vinyl ether. This by-product acid fluoride may react further as is shown by Gibbs in United States Patent 3,020,321, issued Feb. 6, 1962, to yield a fluoroolefin. Reaction times in the present invention are determined principally by the oxide used and the desired conversion of the perfluoro-2-alkoxypropionyl fluoride.

Generally, the reactants are contacted for 0.01 to 10 minutes, and preferably 1 to 60 seconds. Reaction times may be controlled quite effectively when using a bed type reactor by means of suitable gas flow-measuring devices for the input gaseous reactant and the carrier or dilution gas. Variation of the particle size of the oxide in the bed offers a further means of regulating the contact time.

The perfluoro-2-alkoxypropionyl fluorides used in the present invention may be prepared by a variety of techniques. For example, a fluorinated acid fluoride may be reacted with hexafluoropropylene epoxide in the presence of a catalyst comprising activated carbon or an alkali metal, silver or quaternary ammonium fluoride, the fluoride catalyst being employed in combination with a solvent such as a dialkyl ether of a mono- or polyalkylene glycol, or a hydrocarbon nitrile. Catalyst concentration is not critical. The amount of catalyst is determined by the environment in which the reaction is carried out. In general, the concentration of the catalyst is at least 0.01 weight percent of the hexafluoropropylene epoxide. Reaction temperatures may be varied over the range $-80$ to 200° C., although the preferred range is $-30$ to 100° C. Pressures ranging from below atmospheric pressure to several hundred atmospheres may be utilized since it has been established that pressure is not critical. Pressures usually are determined by the physical properties of the reagents. For example, the pressure necessary to maintain a liquid phase will be employed when it is desirable to maintain a liquid phase during the reaction. The aforesaid fluorinated acid fluorides may be either perfluorinated or nonperfluorinated. For example, omega-hydroperfluoroalkyl acid fluorides having the formula $HC_nF_{2n}COF$, wherein $n$ indicates the number of carbon atoms in the alkyl group attached to the acid fluoride group, may be reacted with the epoxide to yield a perfluoro-2-(omega-hydroperfluoroalkoxy)propionyl fluoride which then may be converted to an omega-hydroperfluoroalkyl perfluorovinyl ether by the process of this invention. In another method for the preparation of perfluoro-2-alkoxypropionyl fluorides, hexafluoropropylene epoxide may be polymerized, in the absence of the aforesaid fluorinated acid fluoride, employing catalysts and reaction conditions as described above. When hexafluoropropylene epoxide is utilized, the product may be either a perfluoro-2-propoxypropionyl fluoride or a perfluoro-2-polypropoxypropionyl fluoride depending upon whether two, or more than two hexafluoropropylene epoxide units participate in the reaction. Still another method for the preparation of perfluoro-2-alkoxypropionyl fluorides is a two-stage process wherein a fluorinated acid fluoride is reacted with tetrafluoroethylene epoxide to yield a perfluoro-2-alkoxyacetyl fluoride or a perfluoro-2-polyalkoxyacetyl fluoride which then is converted to the propionyl fluoride by reaction with hexafluoropropylene epoxide. Once again, the catalysts and reaction conditions previously described may be utilized, and again, nonperfluorinated acid fluorides, also, may be reacted with the tetrafluoroethylene epoxide. All the aforesaid preparative methods are exemplified in copending applications Ser. No. 79,961, now U.S. Patent 3,114,778, issued Dec. 17, 1965, to Charles G. Fritz et al., and Ser. No. 158,124, now abandoned. As is obvious from the above, the only prerequisite for the perfluorinated starting material in the present invention is that it must have a perfluoro-2-alkoxypropionyl fluoride end group. Moreover, the instant process is amendable not only to the preparation of monovinyl ethers, but to the preparation of polyvinyl ethers as well. This may be achieved, for example, by replacing the fluorinated monocarboxylic acid fluoride with a fluorinated di- or polycarboxylic acid fluoride in the aforesaid reactions to yield a perfluoro-2-alkoxypropionyl fluoride wherein the alkoxy group is connected to at least one additional 2-oxypropionyl fluoride group. Although not necessarily limited thereto, the perfluoro-2-alkoxypropionyl fluorides useful in the preparation of the vinyl ethers of the present invention include those represented by the following formulae:

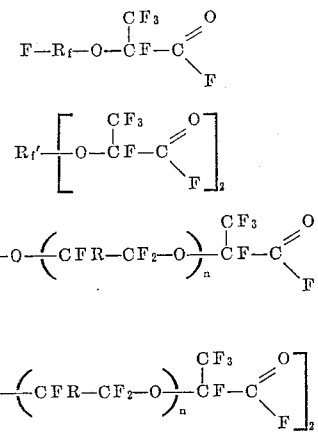

and wherein $R_f$ is a perfluoroalkylene radical having 1 to 12 carbon atoms, $R_f'$ is a perfluoroalkylene radical having 2 to 12 carbon atoms, $n$ is an integer from 1 to 20 and R is either a fluorine or a trifluoromethyl radical. Examples of perfluoro-2-alkoxypropionyl fluorides which are suitable for use in the present invention include perfluoro-2-methoxypropionyl fluoride,
perfluoro-2-ethoxypropionyl fluoride,
perfluoro-2-propoxypropionyl fluoride,
perfluoro-2-isopropoxypropionyl fluoride,
perfluoro-2-butoxypropionyl fluoride
perfluoro-2-isobutoxypropionyl fluoride,
perfluoro-2-(beta-ethylpropoxy)propionyl fluoride,
perfluoro-2-(cyclobutylmethoxy)propionyl fluoride,
perfluoro-2-heptoxypropionyl fluoride,
perfluoro-2-octoxypropionyl fluoride,
perfluoro-2-dodecoxypropionyl fluoride,
perfluoro-2,5-dimethyl-3,6-dioxanonanoyl fluoride,
perfluoro-2,7-dimethyl-3,6-dioxasuberyl fluoride,
perfluoro-2,10-dimethyl-3,9-dioxaundecanedioyl fluoride,
perfluoro-2,5,8-trimethyl-3,6,9-trioxalauroyl fluoride and the like.

The following examples are given to demonstate and not necessarily limit the process of the present invention.

*Example 1*

A nickel tubular reactor 18 inches in length and having an outer diameter of 0.75 inch is inserted into an 18 inch, split-tube furance having a longitudinal opening slightly greater than 0.75 inch in diameter. Suitable thermocouples with sensing ends positioned in the reactor are utilized inconjunction with conventional recorders and relays to control the thermal output of the tubular furance The reactor is filled with about 560 grams (about 100 cc. by volume) of finely divided zinc oxide which is then dried at 400° C. for 18 hours to ensure a moisture content of less than 6 parts per million. During this time, to facilitate removal of water, a metered stream of nitrogen which has been predried by passing through calcium hydride is passed through the reactor. The column temperature then is reduced to 300° C. and maintained at 300 to 325° C. while a stream of perfluoro-2-methoxypropionyl fluoride (50 cc. per minute at standard conditions) is passed through the zinc oxide bed. Prior to entry into the reactor the acid fluoride is diluted using a stream of dry nitrogen as a carrier gas (150 cc. per minute at standard conditions). Under this method of operation, the holdup time of the acid fluoride in the reactor is 0.5 minute. Conversion of acid fluoride is 100%. The gas exiting the reactor is cooled by means of Dry Ice to condnce the fluorinated products. By emplyoling distillative techniques perfluoromethyl perfluorovinyl ether, B.P., $-22°$ C., is obtained in 95% yield.

Infrared and nucluear magnetic resonance spectra are consistent with the structure assigned.

*Example II*

Example I is repeated except that the nitrogen stream is maintained at 100 cc. per minute so as to provide a reactor holdup time for the acid fluoride of 0.67 minute. Conversion of acid fluoride is 100% and the yield of perfluoromethyl perfluorovinyl ether is 95%.

*Example III*

Example I is repeated except that the nitrogen stream is maintained at 50 cc. per minute so as to provide a reactor holdup time for the acid fluoride of 1.0 minute. Conversion of acid fluoride is 100% and the yield of perfluoromethyl perfluorovinyl ether is 95%.

*Example IV*

Example I is repeated except that the perfluoro-2-methoxypropionyl fluoride stream is adjusted to 10 cc. per minute and the nitrogen carrier gas is discontinued. At a holdup time of 10 minutes conversion of the acid fluoride is 98% and the yield of perfluoromethyl perfluorovinyl ether is 60%.

*Example V*

Example I is repeated using about 695 grams (about 100 cc. by volume) of finely divided cadmium oxide in place of the zinc oxide. A like conversion of the acid fluoride and yield of perfluoromethyl perfluorovinyl ether are obtained.

*Example VI*

Example I is repeated using about 330 grams (about 100 cc. by volume) of finely divided calcium oxide in place of the zinc oxide, while the perfluoro-2-methoxypropionyl fluoride input rate is reduced to 25 cc. per minute and the nitrogen stream is discontinued. At a holdup time of 4 minutes conversion of the acid fluoride is 70% and the yield of perfluoromethyl perfluorovinyl ether is 57%. The tendency for calcium oxide to promote side reactions is evidenced by the fact that a 23% yield of trifluoromethyl-1,2,2,2-tetrafluoroethyl ether is obtained.

*Example VII*

The reactor described in Example I is charged with 530 grams (92.5 cc. by volume) of finely divided barium oxide which then is dried at 400° C. for 18 hours under a stream of nitrogen. The oxide bed is cooled to 300° C. and maintained at 300 to 325° C. while a stream of perfluoro-2-methoxypropionyl fluoride is passed through, without a nitrogen carrier, at a rate of 25 cc. per minute (at standard conditions). A holdup time of 3.7 minutes for the acid fluoride gives a 62 percent conversion. The yield of perfluoromethyl perfluorovinyl ether is 80% while the yield of trifluoromethyl-1,2,2,2-tetrafluoroethyl ether is 12%.

*Example VIII*

Example VI is repeated using about 400 grams (about 100 cc. by volume) of finely divided aluminum oxide in place of the calcium oxide. The yield of perfluoromethyl perfluorovinyl ether is about 50%.

*Example IX*

Example I is repeated substituting various alkoxy derivatives for the perfluoro-2-methoxypropionyl fluoride. The acid fluorides used and the ethers recovered as principal products are listend below. Separation of the product from the reaction mixture is achieved either by liquid-vapor distillative or by gas chromatographic techniques. Identification is made by infrared and nuclear magnetic resonance measurements.

| Reactant | Conversion (percent) | Product | Yield (percent) | Boiling Point (° C.) |
| --- | --- | --- | --- | --- |
| Perfluoro-2-ethoxypropionyl fluoride | 70 | Perfluoroethyl perfluorovinyl ether | 80 | ca. 8 |
| Perfluoro-2-propoxypropionyl fluoride | 60 | Perfluoropropyl perfluorovinyl ether | 85 | 35–36 |
| Perfluoro-2-isopropoxypropionyl fluoride | 60 | Perfluoroisopropyl perfluorovinyl ether | 20 | 35 |
| Perfluoro-2-butoxypropionyl fluoride | 65 | Perfluorobutyl perfluorovinyl ether | 85 | ca. 56 |
| Perfluoro-2-isobutoxypropionyl fluoride | 70 | Perfluoroisobutyl perfluorovinyl ether | 25 | ca. 56 |
| Perfluoro-2-heptoxypropionyl fluoride | 75 | Perfluoroheptyl perfluorovinyl ether | 90 | ca. 128 |
| Perfluoro-2-octoxypropionyl fluoride | 80 | Perfluorooctyl perfluorovinyl ether | 70 | 150 |
| Perfluoro-2-dodecoxypropionyl fluoride | 75 | Perfluorododecyl perfluorovinyl ether | 70 | [1] 245 |
| Perfluoro-2,5-dimethyl-3,6-dioxanonanoyl fluoride | 70 | Perfluoro-5-methyl-3,6-dioxanonene-1 | 90 | 101–103 |
| Perfluoro-2,7-dimethyl-3,6-dioxasuberyl fluoride | 80 | Perfluoroethylene glycol bis(perfluorovinyl ether) | 40 | 71–72 |
| Perfluoro-2,10-dimethyl-3,9-dioxaundecanedioyl fluoride | 75 | Perfluoropentamethylene bis(perfluorovinyl ether) | 40 | 128–130 |
| Perfluoro-2,5,8-trimethyl-3,6,9-trioxalauroyl fluoride | 80 | Perfluoro-5,8-dimethyl-3,6,9-trioxadodecene-1 | 75 | [1] 163 |

[1] Estimated.

*Example X*

A 2.5 x 40 inch stainless steel tubular reactor having a sintered metal plug at its exit end is placed in a 20 inch split tube furnace. Suitable thermocouples with sensing ends positioned in the reactor are utilized in conjunction with conventional recorders and relays to control the thermal output of the furnace. The reactor is filled with 3.2 kilograms of silicon dioxide in the form of sand. Dry nitrogen is passed through the reactor at a rate of 2 liters/minute to fluidize the bed while the temperature is brought to 390° C. The nitrogen flow is replaced with vaporized perfluoro-2-methoxypropionyl fluoride. The temperature is maintained at 390±10° C. and fluidization is continued as the propionyl fluoride is passed through the bed at a rate of 1 kilogram/hour. Conversion of the fluoride is 90%. Gas exiting the reactor is scrubbed with caustic solution to remove carbon dioxide and silicon tetrafluoride, then cooled with dry ice to condense the fluorinated products. Employing a distillative separation, perfluoromethyl perfluorovinyl ether is obtained in 95% yield.

*Example XI*

Example X is repeated employing in place of perfluoro-2-methoxypropionyl fluoride either perfluoro-2-propoxypropionyl fluoride or perfluoro-2,8-dimethyl-3,7-dioxa-azelayl fluoride. Further, instead of vaporizing the fluoride directly into the bed, it is dropped on a separate bed of glass beads which are heated to about 250° C. and flashed into a nitrogen stream. The mixture of nitrogen and acid fluoride then is passed into the reactor. Employing the aforesaid fluorides, at conversions of about 60% and 90%, respectively, the vinyl ethers recovered at yields of about 85% and 40%, respectively, are either perfluoropropyl perfluorovinyl ether, B.P. 35 to 36° C., or perfluorotrimethylene glycol bis(perfluorovinyl ether), B.P. 91 to 92° C.

*Example XII*

Example VII is repeated using 615 grams of lead monoxide in place of the barium oxide. Perfluoromethyl perfluorovinyl ether is recovered and identified by means of gas chromatographic analysis.

The process of the present invention has been demonstrated by the foregoing examples which, however, are not intended to limit the scope of the invention. For example, while the process of the present invention, as has been described and exemplified hereinabove, employs a perfluoro-2-alkoxypropionyl fluoride, it has been found that a perfluoro-2-alkoxypropionyl chloride, likewise, may be used as a reactant. In this case, however, it is believed that at least a part of the acid chloride is converted to the acid fluoride during the reaction and thence is converted to the vinyl ether by the same mechanism as when the acid fluoride is used as the starting material. The process described is especially useful for the preparation of perfluorinated vinyl ethers which may be homopolymerized or copolymerized with other ethylenically unsaturated compounds. The divinyl ethers are of particular importance in obtaining cross-linkable perfluorocarbon resins. Particularly useful high molecular weight polymers are obtained by the copolymerization of the aforesaid vinyl ethers with tetrafluoroethylene. The homopolymerization or copolymerization is carried out in accordance with procedures such as described in United States Patent 2,952,669, issued to M. I. Bro on Sept. 13, 1960, employing perfluorinated solvents and initiators. Following is an example of such a copolymerization reaction as set forth in copending application Ser. No. 71,393, now U.S. Patent 3,180,895, issued Apr. 27, 1965, to John F. Harris et al.

A 100 cc. stainless steel autoclave fitted with a magnetically driven stirring blade is flushed with nitrogen and evacuated. A solution of 10 grams (0.06 mole) of perfluoromethyl perfluorovinyl ether in 64 cc. of perfluorodimethyl cyclobutane is admitted to the autoclave. The solution is heated to 60° C. and then tetrafluoroethylene is introduced into the autoclave until a pressure of 300 p.s.i.g. is obtained. Approximately $10^{-4}$ mole of $N_2F_2$ diluted with nitrogen is added to the rapidly stirred mixture. The contents of the autoclave is heated with stirring for 45 minutes at 60° C. and then cooled to room temperature and vented to atmospheric pressure. Solid polymer weighing 11.4 grams is obtained. The melt viscosity of the copolymer at 380° C. is $16 \times 10^{-4}$ poises. Infrared analyses of film of the resin pressed at 250° C. and 25,000 pounds platen pressure indicate that the copolymer contains 11.3 weight percent bound perfluoromethyl perfluorovinyl ether. The films of the copolymer are tough, transparent and colorless.

I claim:
1. A process for the preparation of perfluorovinyl ethers from a perfluoro-2-alkoxypropionyl fluoride selected from the group consisting of

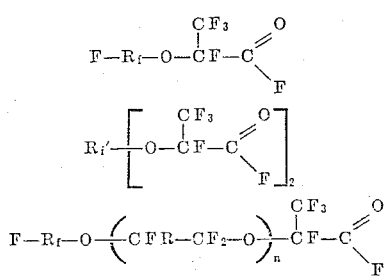

and

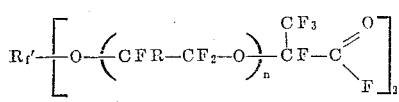

wherein $R_f$ is a perfluoroalkylene radical having 1 to 12 carbon atoms, $R_{f}'$ is a perfluoroalkylene radical having 2 to 12 carbon atoms, $n$ is an integer from 1 to 20 and R is a radical selected from the group consisting of fluorine and trifluoromethyl, which comprises the steps of reacting at an elevated temperature of from 100 to 450° C., said fluoride and at least a stoichiometric quantity of a solid oxide of an element selected from the group consisting of zinc and cadmium, and thereafter recovering said perfluorovinyl ether.

2. A process for the preparation of perfluorovinyl ethers from a perfluoro-2-alkoxypropionyl fluoride selected from the group consisting of

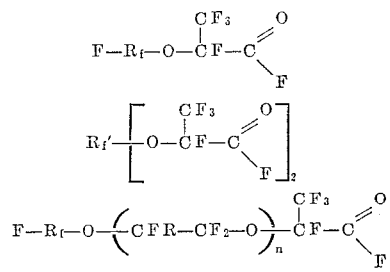

and

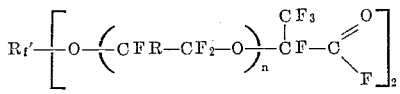

wherein $R_f$ is a perfluoroalkylene radical having 1 to 12 carbon atoms, $R_{f}'$ is a perfluoroalkylene radical having 2 to 12 carbon atoms, $n$ is an integer from 1 to 20 and R is a radical selected from the group consisting of fluorine and trifluoromethyl, which comprises the steps of passing the vapor of said fluoride through a bed of a solid oxide of an element selected from the group consisting of zinc and cadmium at a temperature of 275 to 400° C., and thereafter recovering said perfluorovinyl ether.

3. A process for the preparation of perfluorovinyl ethers from a perfluoro-2-alkoxypropionyl fluoride selected from the group consisting of

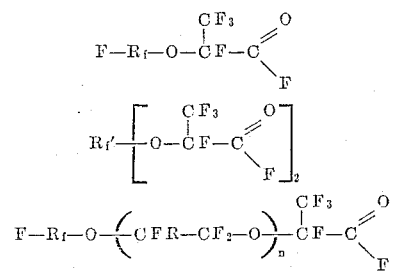

and

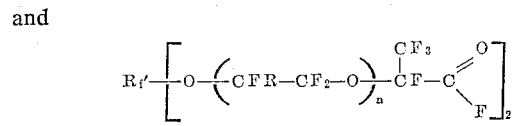

wherein $R_f$ is a perfluoroalkylene radical having 1 to 12 carbon atoms, $R_{f}'$ is a perfluoroalkylene radical having 2 to 12 carbon atoms, $n$ is an integer from 1 to 20 and R is a radical selected from the group consisting of fluorine and trifluoromethyl, which comprises the steps of passing the vapor of said fluoride through a fluidized bed of zinc oxide at a temperature of 275 to 325° C., the quantity of said zinc oxide being at least stoichiometric to said fluoride vapor, the contact time of said oxide and said fluoride vapor being 0.01 to 12 minutes, and thereafter recovering said perfluorovinyl ether.

4. A process for the preparation of perfluorovinyl ethers from a perfluoro-2-alkoxypropionyl fluoride selected from the group consisting of

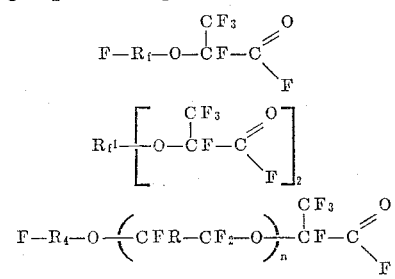

and

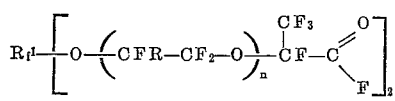

wherein $R_f$ is a perfluoroalkylene radical having 1 to 12 carbon atoms, $R_f'$ is a perfluoroalkylene radical having 2 to 12 carbon atoms, $n$ is an integer from 1 to 20 and R is a radical selected from the group consisting of fluorine and trifluoromethyl, which comprises the steps of passing the vapor of said fluoride through a fluidized bed of cadmium oxide at a temperature of 275 to 325° C., the quantity of said cadmium oxide being at least stoichiometric to said fluoride vapor, the contact time of said oxide and said fluoride vapor being 0.01 to 10 minutes, and thereafter recovering said perfluorovinyl ether.

References Cited by the Examiner
UNITED STATES PATENTS

| | | | |
|---|---|---|---|
| 3,020,321 | 2/1962 | Gibbs | 260—653.3 |
| 3,114,778 | 12/1963 | Fritz et al. | 260—614 |
| 3,180,895 | 4/1965 | Harris et al. | 260—614 |

BERNARD HELFIN, *Acting Primary Examiner.*

LEON ZITVER, *Examiner.*

HOWARD T. MARS, *Assistant Examiner.*